United States Patent
Shanmugasundaram et al.

(10) Patent No.: US 10,552,535 B1
(45) Date of Patent: Feb. 4, 2020

(54) SYSTEM FOR DETECTING AND CORRECTING BROKEN WORDS

(71) Applicant: Amazon Technologies, Inc., Seattle, WA (US)

(72) Inventors: Satishkumar Kothandapani Shanmugasundaram, Chennai (IN); Shubham Chandra Gupta, Chennai (IN); Arpita Agrawal, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 903 days.

(21) Appl. No.: 15/001,113

(22) Filed: Jan. 19, 2016

Related U.S. Application Data

(63) Continuation of application No. 13/671,472, filed on Nov. 7, 2012, now Pat. No. 9,256,592.

(51) Int. Cl.
| | |
|---|---|
| *G06F 17/20* | (2006.01) |
| *G06F 17/27* | (2006.01) |
| *G06F 17/24* | (2006.01) |
| *G06F 17/21* | (2006.01) |
| *G06F 3/0482* | (2013.01) |
| *G06F 3/0484* | (2013.01) |

(52) U.S. Cl.
CPC .......... *G06F 17/273* (2013.01); *G06F 3/0482* (2013.01); *G06F 3/04842* (2013.01); *G06F 17/211* (2013.01); *G06F 17/24* (2013.01)

(58) Field of Classification Search
CPC combination set(s) only.
See application file for complete search history.

(56) References Cited

U.S. PATENT DOCUMENTS

| | | | |
|---|---|---|---|
| 5,265,171 A | 11/1993 | Sangu | |
| 5,410,611 A * | 4/1995 | Huttenlocher | G06K 9/32 382/177 |
| 5,509,092 A | 4/1996 | Hirayama et al. | |
| 5,717,794 A | 2/1998 | Koga et al. | |
| 2003/0152277 A1* | 8/2003 | Hall, Jr. | G06K 9/00463 382/229 |
| 2004/0037470 A1* | 2/2004 | Simske | G06F 17/273 382/229 |
| 2006/0062459 A1* | 3/2006 | Saito | G06K 9/00456 382/181 |
| 2010/0033772 A1* | 2/2010 | Borison | G06T 3/0031 358/474 |
| 2011/0243445 A1 | 10/2011 | Uzelac et al. | |
| 2011/0280481 A1 | 11/2011 | Radakovic et al. | |

* cited by examiner

*Primary Examiner* — Shahid K Khan
(74) *Attorney, Agent, or Firm* — Lowenstein Sandler LLP

(57) ABSTRACT

The positioning of elements of a broken word can be corrected by receiving an optical character recognition (OCR) conversion of a printed publication and identifying multiple parts of the broken word from the OCR conversion to output in a graphical user interface (GUI). The multiple parts can be placed in the GUI using original positioning data for the printed publication. A user can make a selection in the GUI indicating that multiple parts from the OCR conversion are of the broken word and can automatically adjust bounds of the multiple parts to form a corrected word.

20 Claims, 14 Drawing Sheets

SYSTEM FOR DETECTING AND CORRECTING BROKEN WORDS

CROSS-REFERENCE TO RELATED APPLICATIONS

This application is a continuation of U.S. patent application Ser. No. 13/671,472, filed on Nov. 7, 2012, and hereby incorporated by reference in its entirety.

BACKGROUND

Generally, in language, a word is the smallest element with meaning. A written language is the representation of a language by means of a writing system. An alphanumeric writing system may use a set of symbols, letters, and/or numbers, to form a word. In a logographic writing system, a logogram, which is a single written character, is used to represent a complete grammatical word or morpheme. A morpheme is the smallest semantically meaningful unit in a language. For example, some Chinese characters are logograms.

Text is the representation of written language. Printed text can be scanned, for example, using optical character recognition (OCR), to create an electronic image of the text. OCR is the electronic conversion of scanned images into machine-encoded text. The converted machine-encoded text may then be electronically searched and/or used in various machine processes, such as text mining, machine translation, etc. When running an OCR application on a scanned image, boundary information for the text is created. In character recognition, boundaries can be a real or imaginary rectangle which serves as the delimiter between consecutive letters, numbers, and/or symbols in alphanumeric words and between lines in character words (e.g., Chinese character words). The boundary information can include the rectangular coordinates for the lines that make up Chinese character words, and letters, numbers, and/or symbols in alphanumeric words.

Typically, when a scanned image is of poor quality or if the scanned image contains logographic characters (e.g., Chinese characters), the OCR application may make mistakes in detecting the boundaries, and applications and processes, which may rely on the boundary information, may generate incorrect results. For example, a Chinese character word or an alphanumeric word may be split into multiple parts, causing typographical and grammatical errors. Editors may spend a significant amount of time in trying to detect and correct the errors.

BRIEF DESCRIPTION OF THE DRAWINGS

Various implementations in accordance with the present disclosure will be described with reference to the drawings, in which.

DETAILED DESCRIPTION

Systems and methods in accordance with various implementations of the present disclosure provide the ability for users that edit electronic works (e.g., electronic books) to use a graphical user interface (GUI) to quickly and easily detect and correct broken words caused by inaccurate optical character recognition (OCR) boundary detection. Examples of words can include, and are not limited to, alphanumeric words, and logographic character words, such as, and not limited to, Chinese characters, Japanese characters, Korean characters, etc. The elements of alphanumeric words can include letters, numbers, and symbols. The elements of logographic character words can include the lines that make up the characters.

Incorrect OCR boundary information for the elements of words may create broken words. OCR boundary information is also hereinafter referred to as "bounds." The bounds can include the rectangular coordinates for the lines in the logographic character words (e.g., Chinese character words, Japanese character words, etc.), and for the letters, numbers, and/or symbols in alphanumeric words. A broken word can be a word in which the OCR detected a single work as more than one word. For example, a broken word may be a word in which the positioning of the elements (e.g., letters, numbers, symbols, lines, etc.) of the words does not match the original positioning of the elements in a corresponding word in a physical work (e.g., physical book). A broken word may have multiple parts. For example, a word "ninety" may be broken into three parts "ni," "ne," and "ty." When the positions of the elements of the parts of the broken word are corrected to match the original positioning of the elements in the corresponding word in the physical work, the broken word can become a correct word. For example, the positions of "ni," "ne," and "ty" can be fixed to form the correct word "ninety."

In another example, the physical work may be written using other writing systems, such as logographic writing systems, syllabic writing systems, etc. For example, the physical book may be written using a logographic writing system. A logographic character, such as a Chinese character, is a word. A broken word can include a broken Chinese character where the elements (e.g., lines) of the character "現" are separated because the OCR bounds have positioned the lines for the character "現" incorrectly. The e-book editor user can provide user input to indicate the presence of the broken character word. Implementations of the present disclosure can correct the bounds of the lines for the broken character word to match the original positioning data that was collected from the physical book.

Figure 1:
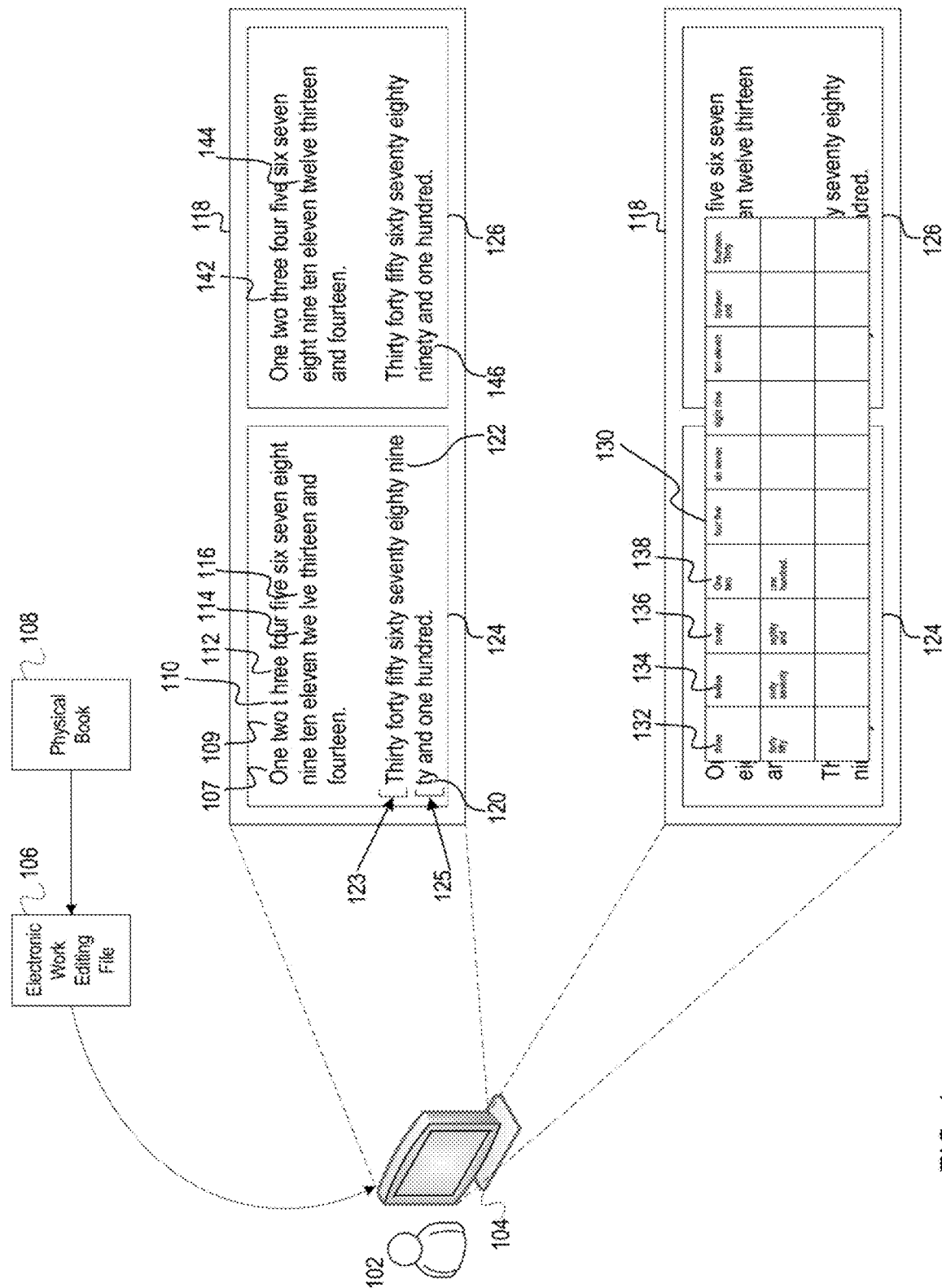
FIGS. 1-2 illustrate an editing device that can advantageously utilize various aspects in accordance with one or more implementations.

FIG. 1 provides a more detailed illustration of detecting and correcting broken words using an organized structure (e.g., grid) in a GUI in accordance with various implementations. For example, an electronic work editor user 102 may use an editing device 104 to edit electronic works. Examples of electronic works include, and are not limited to, electronic books (e-books), electronic magazines, electronic newspapers, electronic journals, electronic comic books, etc. An electronic work may include a single work or a collection of works. For example, an electronic work may include a single book, or an anthology.

An editor user 102 may convert a physical book (e.g., printed publication) into an electronic work (e.g., electronic book (e-book)). The physical book 108 may be scanned and processed to produce an electronic work editing file 106. The electronic work editing file 106 can include original positioning data for the elements (e.g., line, letter, number, symbol, etc.) for each word in the physical book 108, the optical character recognition (OCR) machine-encoded text of the scanned image of the words in the physical book 108, and the OCR boundary information ("bounds") for the machine-encoded text. The bounds can include the rectangular coordinates for the lines in the logographic character words (e.g., Chinese character words, Japanese character words, etc.), and for the letters, numbers, and/or symbols in alphanumeric words.

The editor user 102 can use an editing device 104, such as a computer system, to edit the e-book using the electronic work editing file 106 before the e-book is distributed to consumer users. The editing device 104 can host an electronic reader (e-reader) file editing application to allow the editor user 102 to edit the electronic work editing file 106.

The e-reader file editing application can present a graphical user interface (GUI) 118 in a display on the editing device 104 to the editor user 102. The GUI 118 can include an original scan mode representation 126 that displays a portion (e.g., paragraph, page, etc.) of the physical book 108 as seen in the physical book 108. The original scan mode representation 126 can be created using the original positioning data, in the electronic work editing file 106, for the elements (e.g., lines, letters, numbers, symbols, etc.) for each word in the physical book 108.

The GUI 118 can also include a reflow mode representation 124 to present the elements of the words from the physical book 108 in positions as would be displayed in an electronic output device, such as an electronic reading device. Document reflow is the adjusting of a document for a graphical user interface for a particular device. In some implementations, the original scan mode representation 126 and the reflow mode representation 124 are in panes that are side-by-side in the GUI 118. The reflow mode representation 124 is a preview pane that mimics how the words from the physical book 108 would be displayed in an electronic reading device. The positioning of the elements of the words for the electronic reading device can be based on the OCR bounds in the electronic work editing file 106.

The OCR bounds may not be accurate, and the positioning of the elements of the words in the reflow mode representation 124 may not match the positioning of the elements of the corresponding words in the original scan mode representation 126. For example, the original scan mode representation 126 may display what may appear to the user 102 to be twenty-five alphanumeric words. The reflow mode representation 124 may be using the incorrect bounds and may display what may appear to the user 102 to be twenty-eight words in the reflow mode representation 124. The reflow mode representation 124 can include parts of broken words, such as "t" 110, "hree" 112 "twe" 114, "lve" 116, "nine" 122, and ""ty" 120.

The positioning of the broken words in the reflow mode representation 124 does not match the positioning of the elements of the corresponding words in the original scan mode representation 126. For example, the reflow mode representation 124 may include a first part, "t" 110, followed by a second part "hree" 112 of a broken word, whose elements do not match the original positioning of the elements of the corresponding word "three" 142 in the original scan mode representation 126. In another example, the reflow mode representation 124 may include a first part, "twe" 114, followed by another part "lve" 116 of a broken word, whose elements do not match the original positioning of the elements of the corresponding word "twelve" 144 in the original scan mode representation 126.

A broken word can have one or more parts that reflow into different reflow lines. For example, the reflow mode representation 124 may include a first part "nine" 122 of a broken word in the reflow line 123 followed by a second part "ty" 120 of the broken word in another reflow line 125. The positioning of the multiple parts "nine" 122 and "ty" 120 of the broken word do not match the original positioning of the elements of the corresponding word "ninety" 146 in the original scan mode representation 126.

In one implementation, when the editor user 102 is reviewing the portions (e.g., paragraphs, pages) of the e-book using the original scan mode representation 126 and the reflow mode representation 124, the e-reader file editing application can provide a window in the GUI 118 that shows the words, of the portion currently being reviewed, in an organized structure (e.g., grid, table, etc.). An organized structure can include sections, such as, and not limited to, cells, boxes, lists, etc. For brevity and simplicity, a grid is used as an example of an organized structure and a cell is used as an example of a section throughout this document.

The organized structure (e.g., grid 130) can allow an editor user 102 to quickly identify and correct broken words. In some implementations, the organized structure (e.g., grid) is in a pop-up window over-laying the panes of the original scan mode representation 126 and the reflow mode representation 124 in the GUI 118. The e-reader file editing application can use the bounds, which may not be correct, in the electronic work editing file 106 to identify the words to place in the cells in the grid 130. For example, the bounds may indicate that "t" 110 is a word and that "hree" 112 is another word. The e-reader file editing application may operate on "t" 110 and "hree" 112 as two separate words when populating the cells in the grid 130. For example, the e-reader file editing application may be configured to distribute two words in each cell in the grid 130. The e-reader file editing application may place "t" and "hree" as two separate words in cell 132, may place "twe" and "lve" as two separate words in cell 134, and may place "nine" and "ty" as two separate words in cell 136.

The e-reader file editing application can use the original positioning data in the electronic work editing file 106 to determine how to position the multiple parts of the broken words, for example, "t," "hree," "twe," "lve," "nine," and "ty," in the cells. For example, the original positioning data may indicate that there should be 0.1 mm distance between "t" and "hree," and the e-reader file editing application may position the two words "t" and "hree" 0.1 mm from each other in cell 132 in the grid 130, such that the editor user 102 may perceive that there is a single word "three" in the cell 132.

The e-reader file editing application can use the grid 130 to identify which words in the reflow mode representation 124 are broken words and can automatically correct the incorrect positions of the parts (e.g., elements) of the broken words in the reflow mode representation 124 to match the original positions of the elements of the corresponding words in the physical book 108. For example, the e-reader file editing application may be configured to place two words in each cell in the grid 130. The e-reader file editing application can request the user 102 to select a first instance of a cell in the grid 130 that appears to the user 102 to contain two words. For example, the e-reader file editing application can receive user input of a selection of cell 138 in the grid 130. The e-reader file editing application can identify that the cells (e.g., cell 132, cell 134, and cell 136) that are preceding the selected cell (e.g., cell 138) each have a broken word. The e-reader file editing application can correct the positioning of "t" 110 and "hree" 112, "twe" 114 and "lve" 116, and "nine" 122 and "ty" 120 in the reflow mode representation 124 to match the original positioning data that was collected from the physical book 108 to form the corresponding corrected words.

Figure 2:
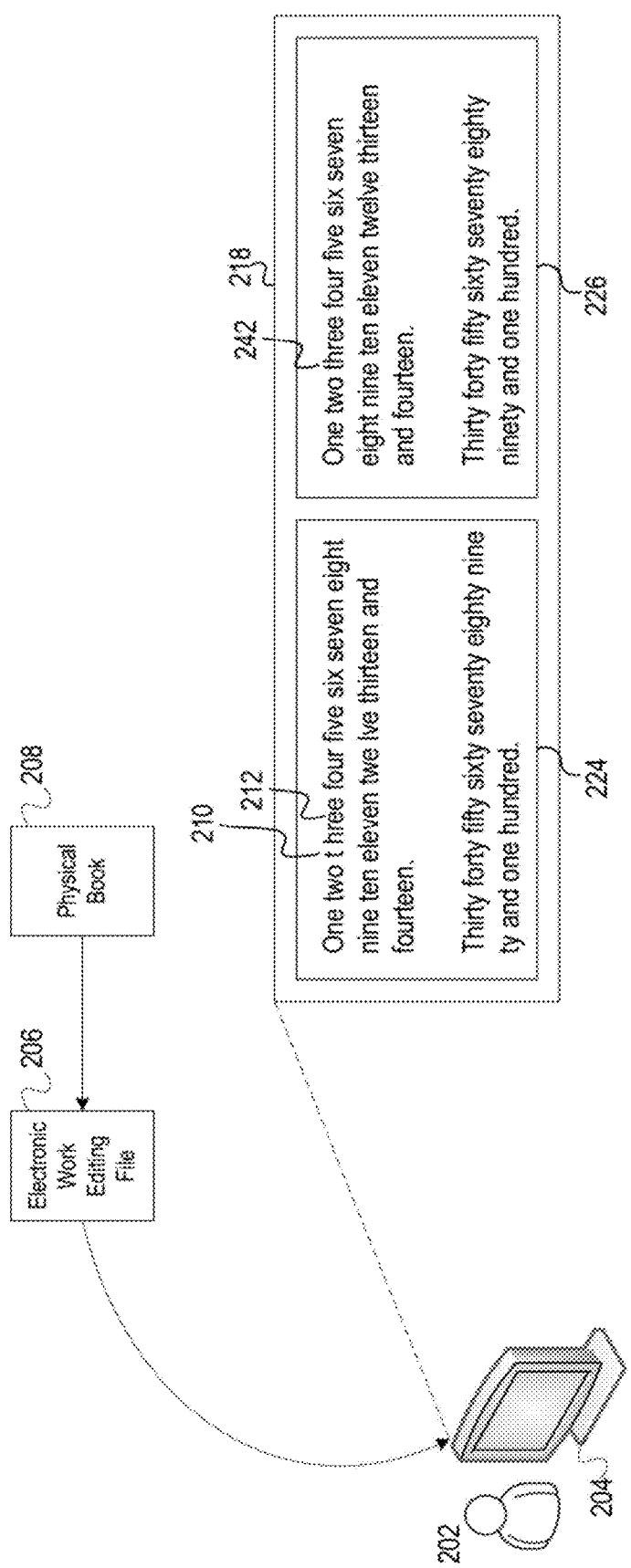

FIG. 2 provides a more detailed illustration of detecting and correcting broken words using an original scan mode in a GUI in accordance with various implementations. For example, an editor user 202 may look at the reflow mode representation 224 and may see differences in the positioning of the elements of the words in the reflow mode representation 224 as compared to the positioning of the elements of the words in the original scan mode representation 226. For example, the editor user 202 may see that positioning of the elements "t" 210 and "hree" 212 in the reflow mode representation 224 are different from the positioning of the elements in "three" 242 in the original scan mode representation 226. The editor user 202 can use the GUI 218 to independently select words in the original scan mode representation 226, which the user has identified to be broken words. For example, the editor user 202 can use the GUI 218 to draw a box around the word "three" 242 in the original scan mode representation 226 to identify the word "three" 242 is a broken word. In response to the user selection of the one or more words (e.g., three 242), the e-reader editing file application can corrected the selected word formed by ensuring the element (e.g., letter) spacing from the original scan mode representation 226 for the selected word (e.g., three 242) is followed for the corresponding word in the reflow mode representation 224. For example, the user 202 may select the word "three" 242 and the e-reader editing file application can bring the positions of these elements (e.g., letters) together in the reflow mode representation 224, such that "t" and "hree" no longer flow separately. One implementation of using an original scan mode to detect and correct broken words is described in greater detail below in conjunction with FIG. 8.

Figure 3:
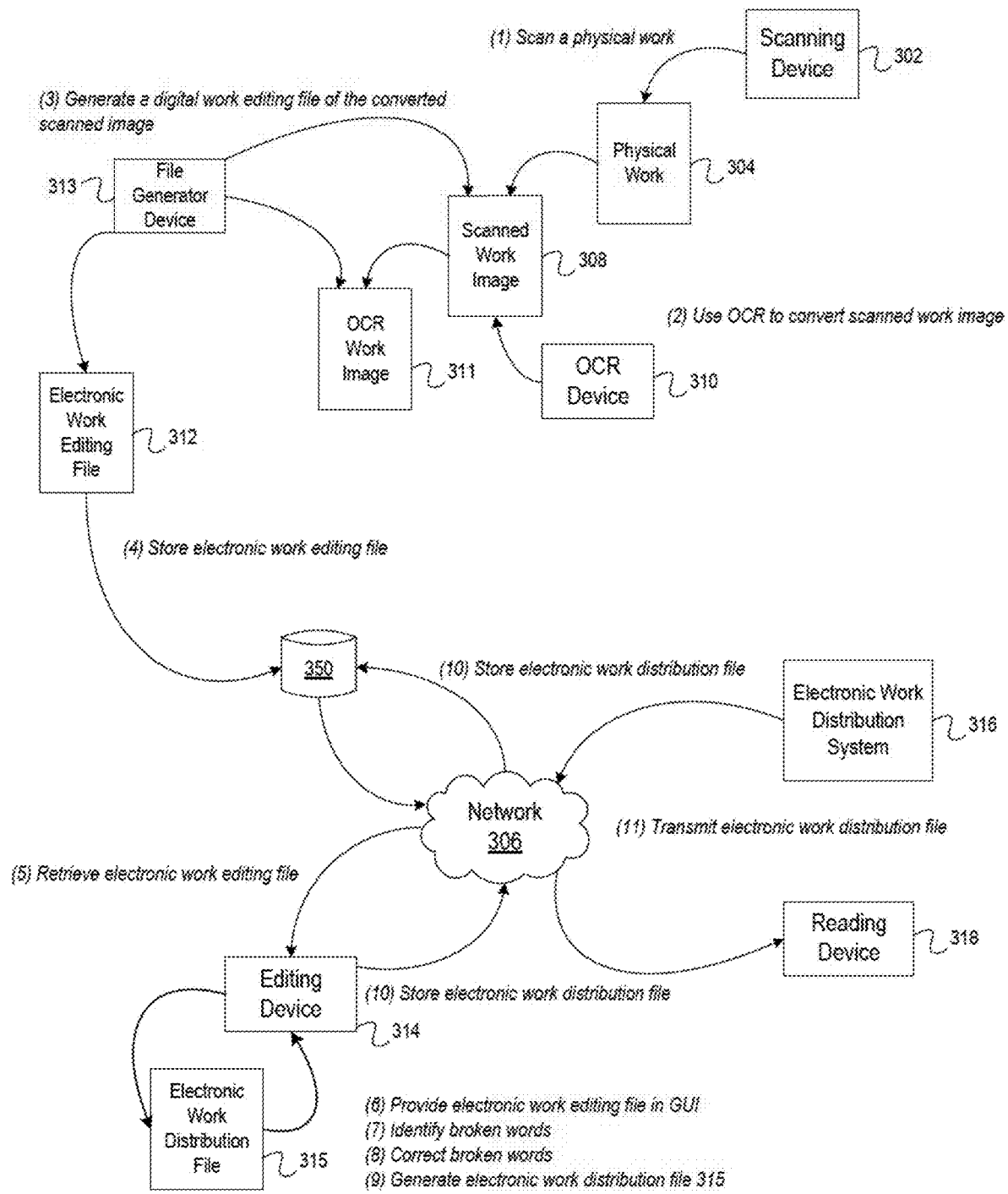
FIG. 3 illustrates an example of detecting and correcting broken words when converting a physical work into an electronic work in accordance with one or more implementations.

FIG. 3 illustrates an example of detecting and correcting broken words in accordance with one or more implementations. Continuing with the example of converting a physical book to an e-book, a scanning device 302 can scan a physical book 304 to create a scanned work image 308 of the physical work 304. The scanning device 302 may scan all of the pages in the physical book 304. The scanned work image 208 may contain images of the text of the physical book 304.

An optical character recognition (OCR) device 310 can host an OCR engine and can run the OCR engine on the scanned work image 308 to convert the images of text into machine-encoded text. When running the OCR engine, the OCR device 310 can create boundary information (bounds) for the machine-encoded text. The OCR device 310 can generate an OCR work image 311 that includes the machine-encoded text and the bounds for the physical book 304.

A file generator device 313 can use the OCR work image 311 and the scanned work image 308 to create an electronic work editing file 312. The electronic work editing file 312 is a file that can be used by an e-reader file editing application hosted on an editing device 314 for editing an electronic work (e.g., e-book) before the electronic work is publicly distributed. The file generator device 313 can capture the original positions of the elements of the words in the scanned work image 308 and create original positioning data for the elements of the words in the physical book 304. The original positioning data can include x-y coordinates for each element (e.g., letter, number, symbol, line) in a word (e.g., alphanumeric word, logographic character word). The x-y coordinates may be rectangular coordinates. The file generator device 313 can include the original positioning data, the OCR machine-encoded text, and the OCR bounds in the electronic work editing file 312. The electronic work editing file 312 can be stored in a data store 350.

The editing device 314 can retrieve the electronic work editing file 312 from the data store 350 over the network 306. The e-reader file editing application can provide the electronic work editing file 312 in a graphical user interface (GUI) to an editor user in a display in the editing device 314. The e-reader file editing application can include windows and panes in the GUI that present the words from the physical work 304. The e-reader file editing application can receive input from an editor user and can use the input to identify which words are broken words.

The e-reader file editing application can use the input received from the editor user to automatically correct the broken words. Implementations of correcting the broken words are described in greater detail below in conjunction with FIG. 4 and FIG. 8. When the broken words are corrected, the e-reader file editing application can generate an electronic work distribution file 315 and store the electronic work distribution file 315 in the data store 350. An electronic work distribution file 315 is a file that can be publicly distributed and used by electronic reading devices 318 to provide electronic versions of physical works to end users. An electronic work distribution system 316 can transmit the electronic work distribution file 315 to a reading device 318. For example, the electronic work distribution file 315 is an e-book of a physical book. An end user may use the reading device 318 to purchase the e-book and the electronic work distribution system 316 may transmit the electronic work distribution file 315 for the e-book to the reading device 318.

Figure 4:
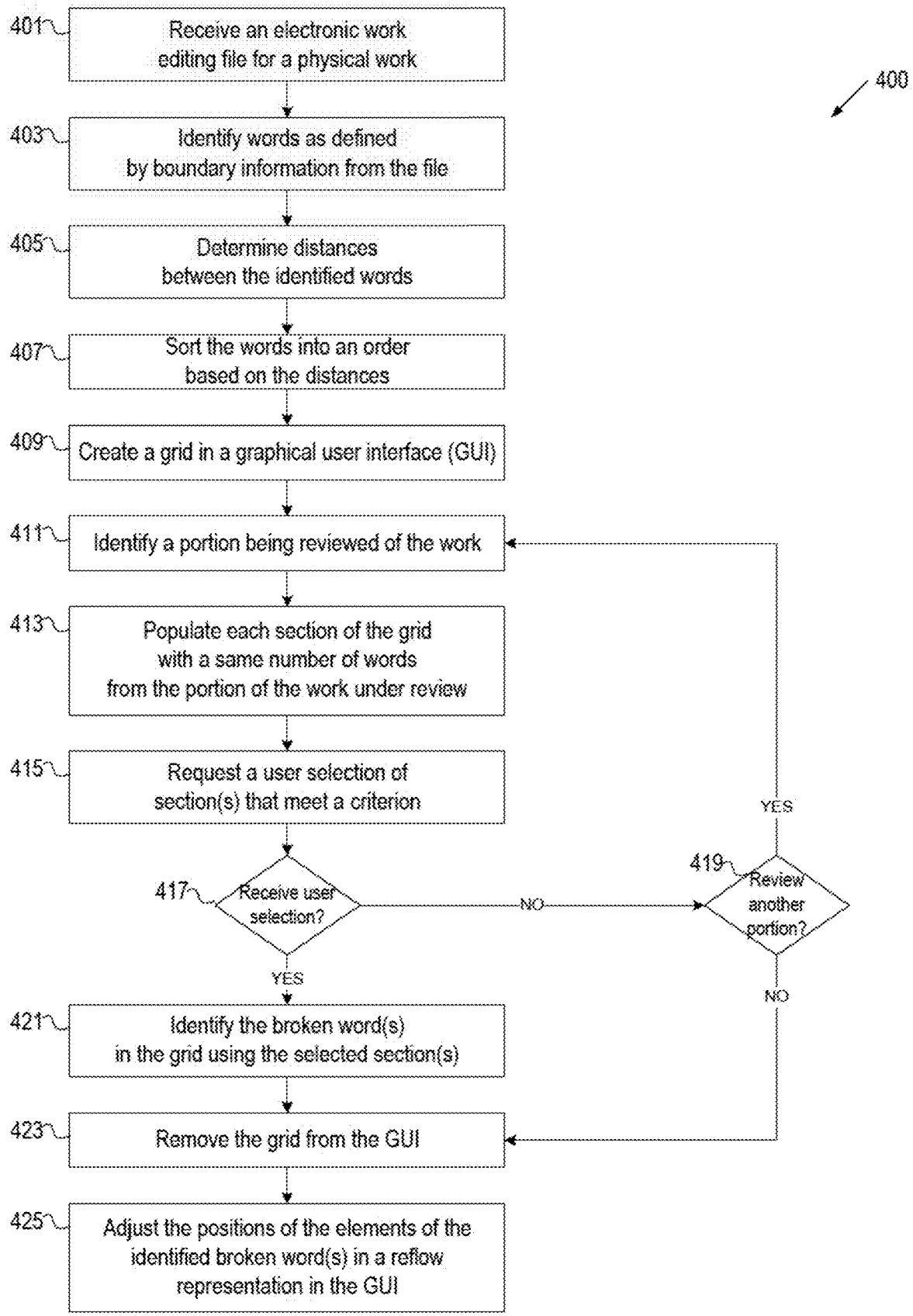
FIG. 4 illustrates an example method for identifying and correcting broken words that can be used in accordance with one or more implementations.

FIG. 4 illustrates an example method 400 for identifying and correcting broken words using an organized structure in a graphical user interface that can be used in accordance with one or more implementations. The method 400 may be performed by processing logic that may comprise hardware (circuitry, dedicated logic, etc.), software (such as is run on a general purpose computer system or a dedicated device), or a combination of both. In some implementations, the method 400 is performed by a word positioning module (e.g., word positioning module 1301 of FIG. 13).

At block 401, processing logic receives an electronic work editing file for a physical work. The electronic work editing file can include original positioning data for the elements (e.g., lines, letters, numbers, symbols, etc.) for each word in the physical book, the OCR machine-encoded text for the words from the physical work, and the OCR boundary information (bounds) for the machine-encoded text.

At block 403, processing logic identifies words as arranged by the OCR bounds. The words arranged from the OCR bounds may differ from words arranged by the original positioning data in the electronic work editing file. For example, the original positioning data may arrange "three" as a single word, whereas the OCR bounds may arrange two words "t" and "hree." In one implementation, processing logic uses heuristics and/or user input to make use of an arrangement of a word to determine whether the word is broken or not.

At block 405, processing logic determines the distances between the identified words (e.g., "t" and "hree") as arranged by the OCR bounds. The OCR bounds can include x-y coordinates for the elements (e.g., letters, numbers, symbols, lines) in the words as determined from a scanned image of the physical work. A word can include a monogram. The elements of a monogram can include an image (e.g., raster) and a letter (e.g., vector) which can be combined to form a monogram. For each identified word, processing logic can locate the x-y coordinates for the elements of word and can calculate the distances between the identified words. For example, processing logic may determine that the x-y coordinates for "t" and the first letter "h" in "hree" and can use the x-y coordinates for "t" and "h" to determine the distance between the identified words "t" and "hree." Processing logic can calculate a distance in terms of a measurement scale associated with the coordinates. For example, the distance may be calculated in terms of millimeters. For example, the bounds for the elements for "t" and "hree" may indicate that there should be 0.1 mm between "t" and "hree".

At block 407, processing logic sorts the words into an order based on the distances between adjacent words. For horizontal orientation text, the x-coordinates can be used for distance measurements. For vertical orientation text, the y-coordinates can be used for the distance measurements. For example, the order may be from the smallest distance to the largest distance. The parts of broken words, such as "t" and "hree," may have distances in between them that are less than the distances between correct words, such as the distance between "one" and "two." Processing logic may place the parts of the broken words, in the order, before the correct words.

At block 409, processing logic creates an organized structure (e.g., grid, table, groups of lists, etc.) in a graphical user interface (GUI). At block 411, processing logic identifies a portion of the work that is currently being reviewed. Examples of a portion can include, and are not limited to, a page, a paragraph, a chapter, a pre-determined number of words, a pre-determine number of sentences, a percentage of the work, etc. For example, an editor user may be currently reviewing a particular page of the work. Processing logic may identify the portion that is currently under review by identifying the content of a reflow mode representation and/or an original mode representation in the GUI.

At block 413, processing logic populates each section of the organized structure with the same number words from the portion of the work that is currently under review. Examples of sections can include, and are not limited to, cells, boxes, lists in a group of lists, etc. The number of words can be a pre-determined and/or configurable number. For example, processing logic may distribute two words in each cell in a grid. In another example, processing logic may place two words in each box in a table. In another example, processing logic may allocate two words in each list in the group of lists.

At block 415, processing logic requests a user selection of one or more sections, of the organized structure, that meet a criterion to indicate the presence of one or more broken words in the organized structure. Processing logic can create a message in the GUI requesting that the editor user to select one or more sections in the organized structure. In some implementations, the criterion is that the selected section is the first section that appears to contain the pre-determined number of words.

At block 417, processing logic determines whether user input of the selected one or more sections are received. If user input is not received, processing logic can determine whether there is another portion (e.g., page, paragraph, etc.) of the work being reviewed. In some implementations, processing logic uses a timeout to determine when user input is not received. If another portion is being reviewed (block 419), processing logic returns to block 411 to identify the portion under review. If another portion is not being reviewed (block 419), processing logic removes the organized structure (e.g., grid) from the GUI at block 423.

If user input of a selection of one or more sections is received (block 417), processing logic identifies the broken words in the organized structure using the selected section(s) at block 421. For example, if the criterion is to select is the first section that appears to contain the pre-determined number of words, processing logic may determine that the un-selected section(s) preceding the selected cell each contain a broken word.

At block 423, processing logic removes the organized structure (e.g., grid) from the GUI. For example, processing logic may close the GUI window that contains the organized structure. At block 425, processing logic corrects the positioning of the elements of the identified broken words in the reflow mode representation in the GUI to match the original positioning data of the elements of the corresponding words in the physical work. For example, processing logic may add the bounds of each of the multiple parts to each other in the reflow mode representation to form the corrected word. For example, processing logic may add the bounds of "t" to the bounds of "hree" in the reflow representation mode, such that an editor user may perceive a single word, such as "three." Processing logic can add the bound for each of the multiple parts to change the distance between the multiple parts and merge the elements to form a single correct word. Processing logic may then use the corrected words in the reflow mode representation to create a distribution file for the election version of the physical work.

Figure 5:
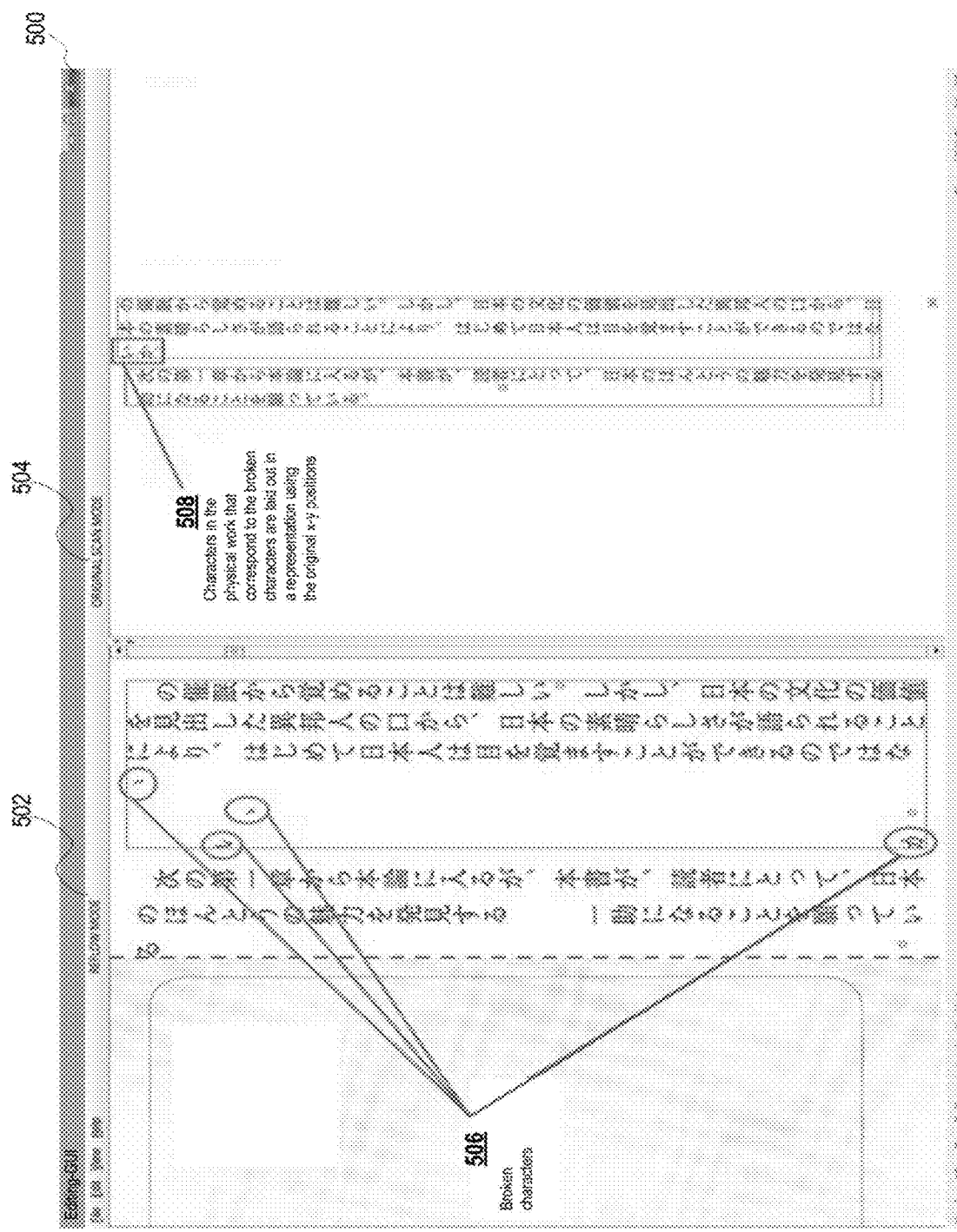
FIGS. 5-7 illustrate example graphical user interfaces for detecting and correcting broken words in accordance with one or more implementations.
Figure 6:
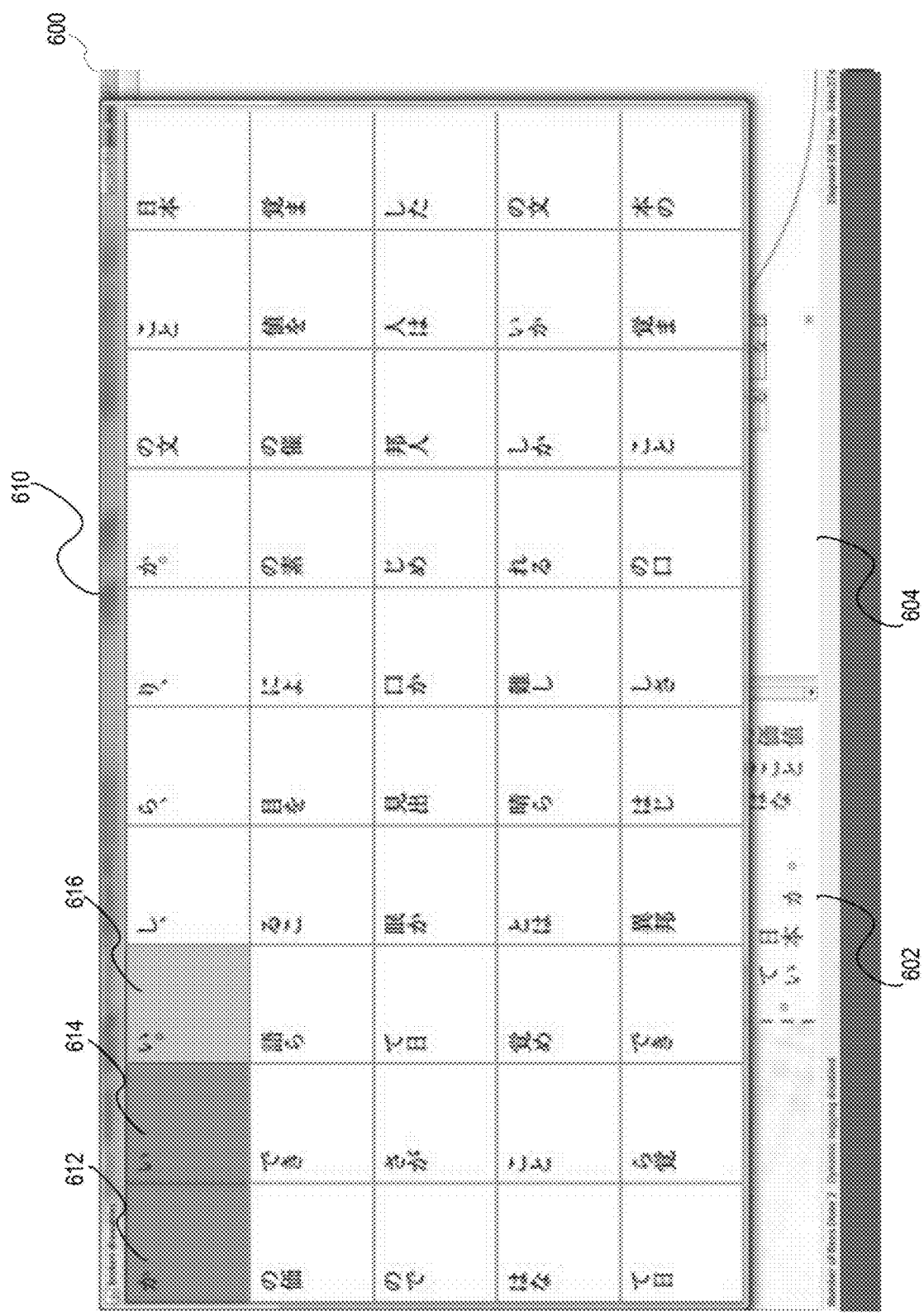
Figure 7:
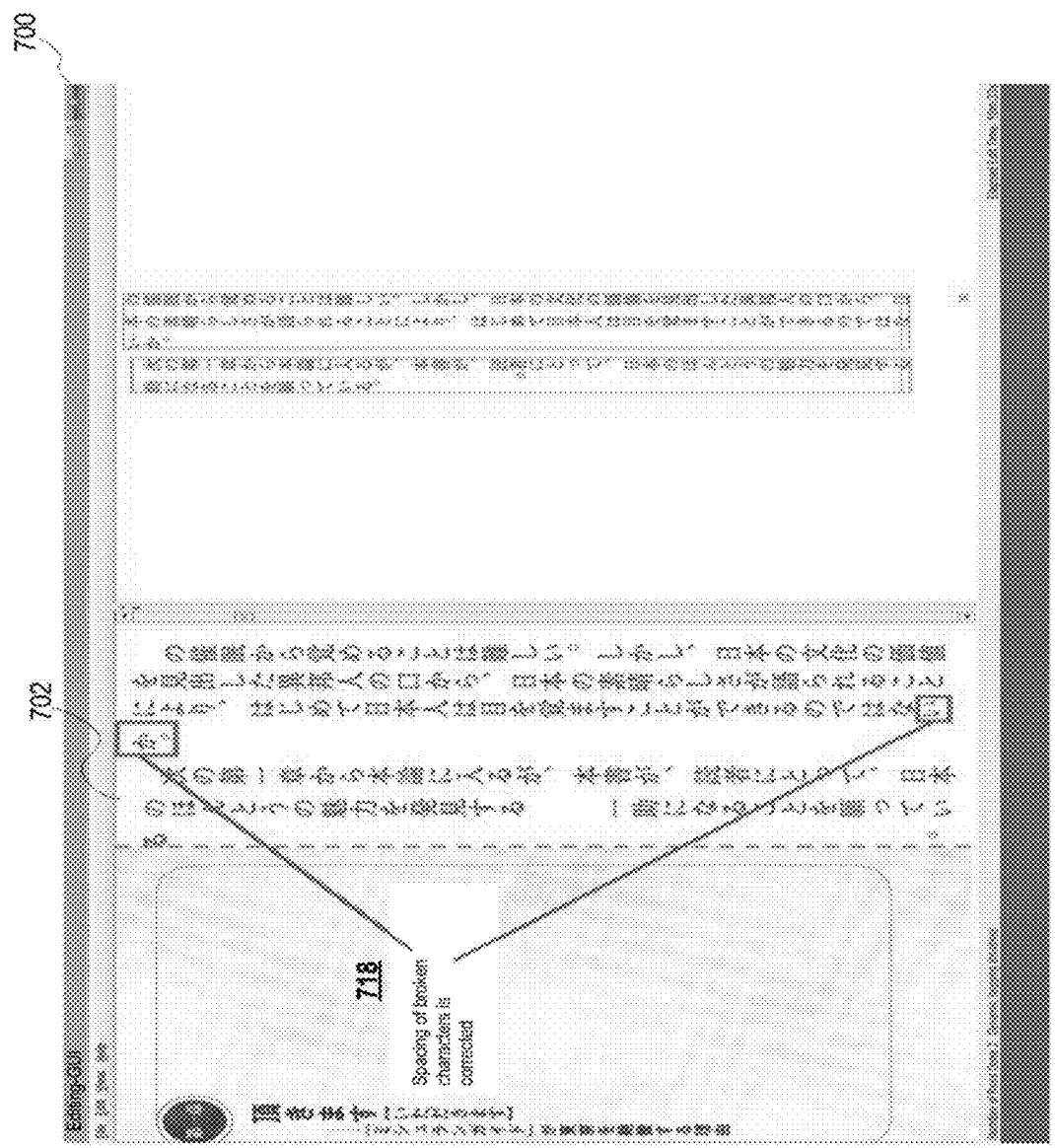

FIGS. 5-7 illustrate example GUIs for detecting and correcting broken words in accordance with one or more implementations. The GUIs can be generated by an e-reader file editing application hosted by an editing device. FIG. 5 illustrates an example GUI 500 that includes an original scan mode representation 504 and a reflow mode representation 502, for example, in panes in the GUI 500. The original scan mode representation 504 includes logographic character words, such as Japanese character words, positioned in the pane using the original positioning data (e.g., x-y coordinates) of the elements (e.g., lines) of the character words as placed in the physical work. The elements of the character words in the original scan mode representation 504 have corresponding bounds that were generated by an OCR device. The bounds (e.g., x-y coordinates) may be used to position the elements of the character words in the reflow mode representation 502. The elements of the character words in the reflow mode representation 502 are positioned as would be seen in an electronic reading device.

Some of the bounds (e.g., x-y coordinates) for the elements of the character words may not be accurate. For example, the elements of two character words 508 that are displayed in the original scan mode representation 504 may have bounds that are incorrect. Since the elements of the character words in the original scan mode representation 504 are positioned using the original positioning data of the elements of the character words as placed in the physical work, an editor user may not easily detect from the original scan mode representation 504 that the elements of the two character words 508 have incorrect bounds.

The editor user may determine, from the reflow mode representation 502, which character words have incorrect bounds. For example, the position of the elements of the two character words 506 in the reflow mode representation 502 should correspond to the positions of the elements of the two character words 508 in the original scan mode representation 504, but the positions of the elements of the two character words 506 in the reflow mode representation 502 do not match the positions of the elements of the corresponding two character words 508 in the original scan mode representation 504.

The e-reader file editing application can create an organized structure (e.g., grid, table, group of lists) in the GUI 500 to allow an editor user to quickly and easily identify broken character words in the reflow mode representation 502. FIG. 6 illustrates an example GUI 600 that includes an organized structure, such as grid 610, in a window. In some implementations, the grid 610 is in a window that that overlays the pane for the original scan mode representation 604 and the pane for the reflow mode representation 602. The e-reader file editing application can use user input, received from the editor user via the grid 610, to determine which character words in the grid 610 are broken character words.

Each cell in the grid 610 can be configured to contain the same pre-determined number (e.g., two) of character words. In one implementation, the e-reader file editing application can request the editor user, for example, via a message in the GUI 600, to select a first instance of a cell in the grid 610 that appears to the editor user to contain the pre-determined number (e.g., two) of character words. For example, the editor user may select cell 616. The e-reader file editing application can identify the cells (e.g., cell 612, cell 614) that are preceding the selected cell (e.g., cell 616) to contain a broken word.

In some implementations, the e-reader file editing application requests the editor user to select the one or more cells that appear to contain less than the pre-determined number (e.g., two) of characters. For example, the editor user may select cell 612 and cell 614 because the cells appear to contain one character word each. The e-reader file editing application can determine that each of the user-selected cells (e.g., cell 612, cell 614) contain a broken character word. In some implementations, the e-reader file editing application requests the editor user to select the one or more cells that appear to contain the pre-determined number (e.g., two) of character words. For example, the editor user may select all of the cells except for cell 612 and cell 614. The e-reader file editing application can determine that the un-selected cells (e.g., cell 612, cell 614) each contain a broken character word.

The e-reader file editing application can remove the grid 610 from the GUI 600 and correct the positioning of the broken character word(s) in reflow mode representation 602. FIG. 7 illustrates an example GUI 700 that includes a reflow mode representation 702 where the elements of the character words 718 are now correctly positioned. For example, the e-reader file editing application can adjust the positions of the elements (e.g., lines) of the character words to match the original positioning data to form the correct character words.

For example, the e-reader file editing application can add the bounds of the elements (e.g., lines) to each other to match to match the original positioning data.

Figure 8:
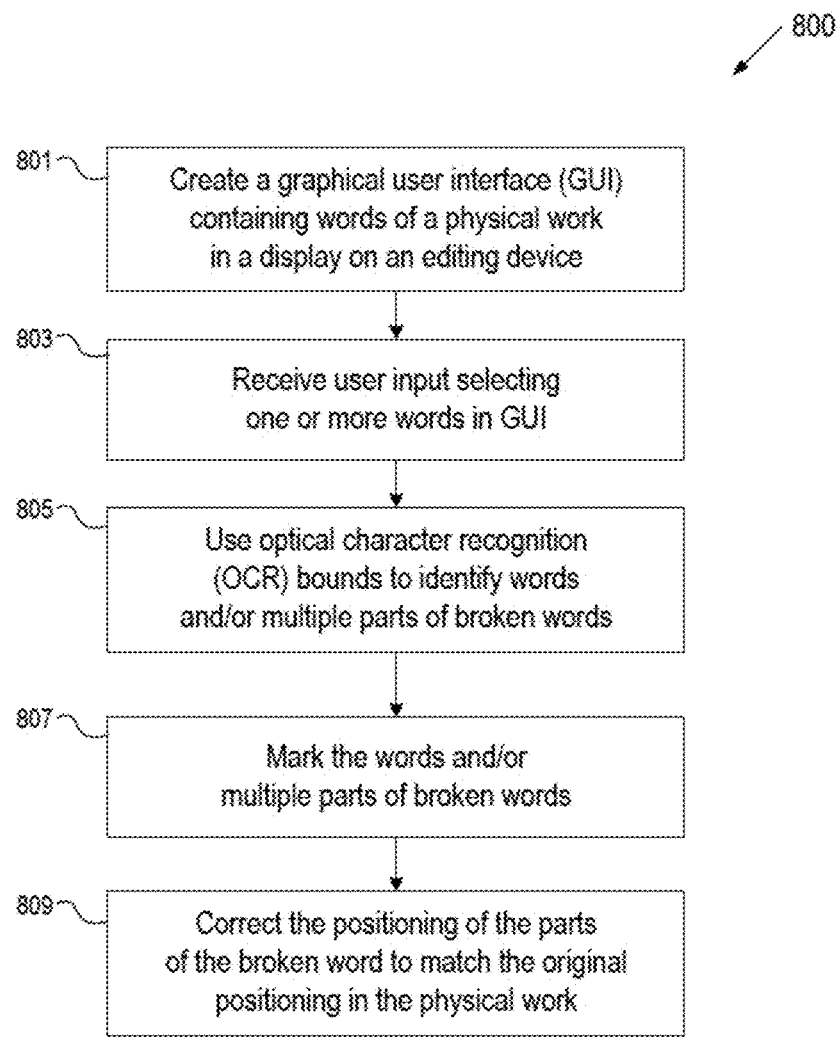
FIG. 8 illustrates an example method for identifying and correcting broken words that can be used in accordance with one or more implementations.

FIG. 8 illustrates an example method 800 for detecting and correcting broken words using an original scan mode representation that can be used in accordance with one or more implementations. The method 800 may be performed by processing logic that may comprise hardware (circuitry, dedicated logic, etc.), software (such as is run on a general purpose computer system or a dedicated machine), or a combination of both. In some implementations, the method 800 is performed by a word positioning module (e.g., word positioning module 1301 of FIG. 13).

At block 801, processing logic creates a GUI containing words of a physical work in a display on an editing device. The GUI can include window panes presenting an original scan mode representation and a reflow mode representation. In some implementations, the original scan mode representation and the reflow mode representation are in panes that are side-by-side in the GUI. The GUI can include an original scan mode representation that displays a portion (e.g., paragraph, page, etc.) of a physical work as seen in the physical work. The original scan mode representation can be created using the original positioning data for the elements for each word in the physical work. The reflow mode representation mimics how the elements of the words from the physical work would be displayed in an electronic reading device. The positioning of the elements of the words for the electronic reading device can be based on the OCR boundary information (bounds) in an electronic work editing file created from the physical work.

At block 803, processing logic receives user input, via the GUI, selecting one or more words in the GUI, for example, in the original scan mode representation. The OCR bounds may not be accurate, and the positioning of the elements of the words in the reflow mode representation may not match the positioning of the elements of the corresponding words in the original scan mode representation. For example, an editor user may look at the reflow mode representation and may see differences in the positioning of the elements of the words in the reflow mode representation as compared to the positioning of the elements of the words in the original scan mode representation. Processing logic may receive a user selection of a box drawn around particular words in the original scan mode representation, which may appear in the reflow mode representation to be broken words or processing logic may receive a user selection of a box drawn around each word in the original scan mode representation. For example, the original scan mode can include the word bounds from the OCR on top of the display of the words and a user may see, for example, that if a single word has two separate bounds, the word may be determined to be a broken word. Examples of a user selection can include, and are not limited to, a box drawn around a word, a highlighted word, a mouse click of a word, etc.

Figure 9:
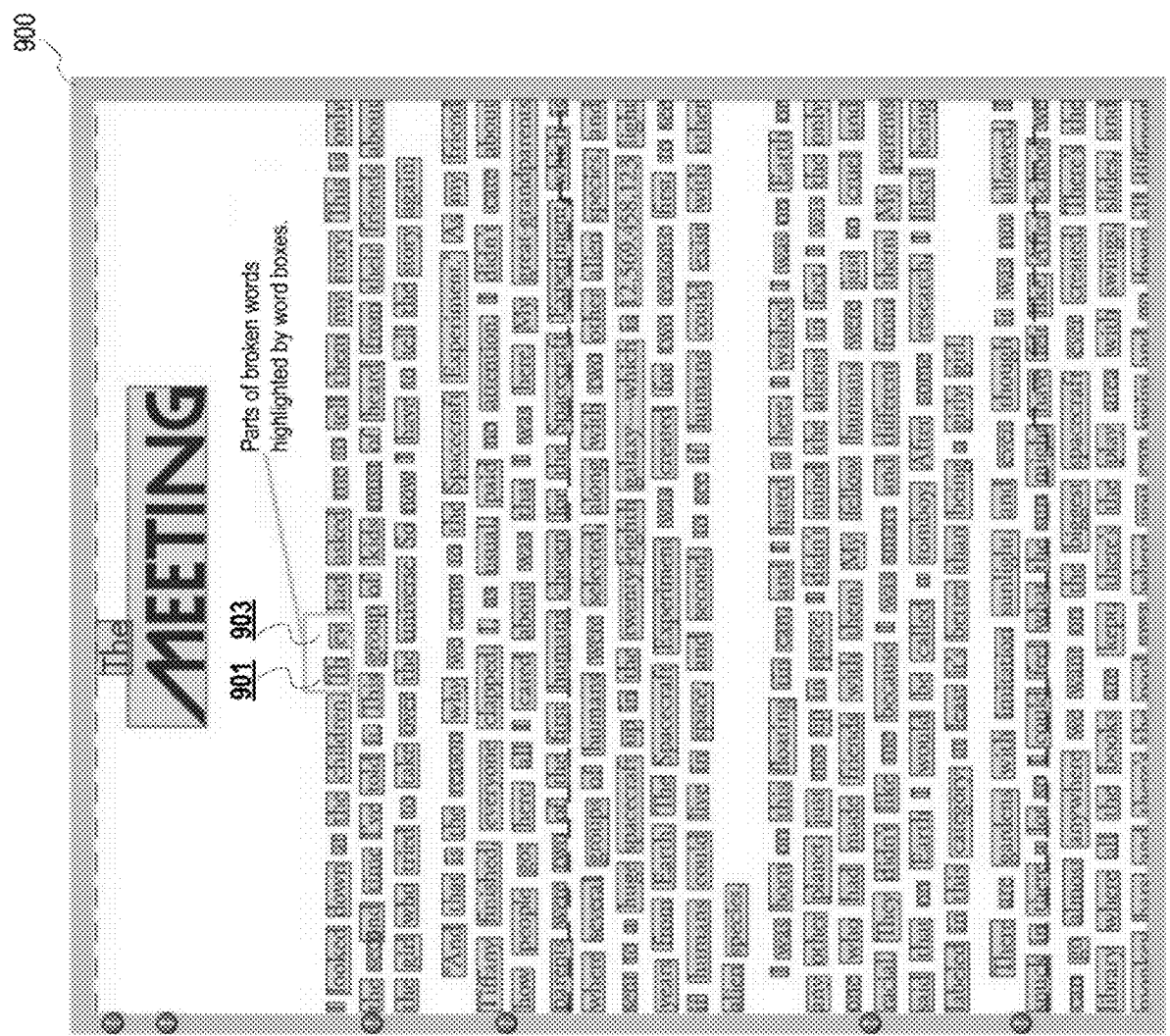
FIGS. 9-12 illustrate example graphical user interfaces for detecting and correcting broken words in accordance with one or more implementations.

At block 805, processing logic uses the OCR bounds to identify words and/or multiple parts of broken words as arranged by the OCR bounds and can mark the words and/or multiples parts of the broken words in the GUI, for example, in the original scan mode in the GUI, at block 807. For example, processing logic may place a box around each word and/or part of the broken words. FIG. 9 is an example GUI that includes an original scan mode representation window 900 in the GUI. The original scan mode representation window 900 can mark words and/or parts of broken words with boxes as arranged by OCR bounds. For example, box 901 and box 903 identify "Th" and "ey" as multiple parts of a broken word.

Figure 10:
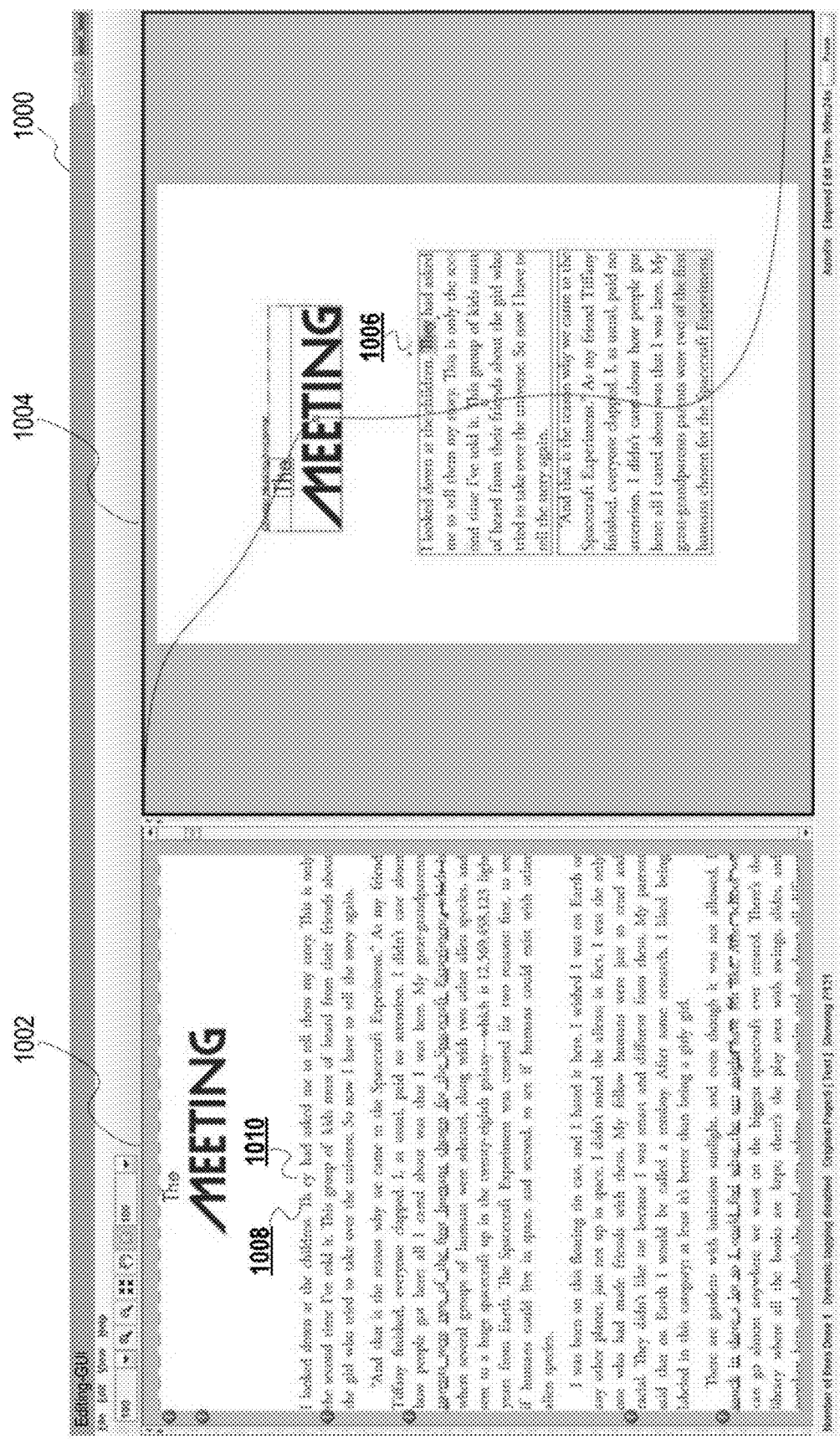
Figure 11:
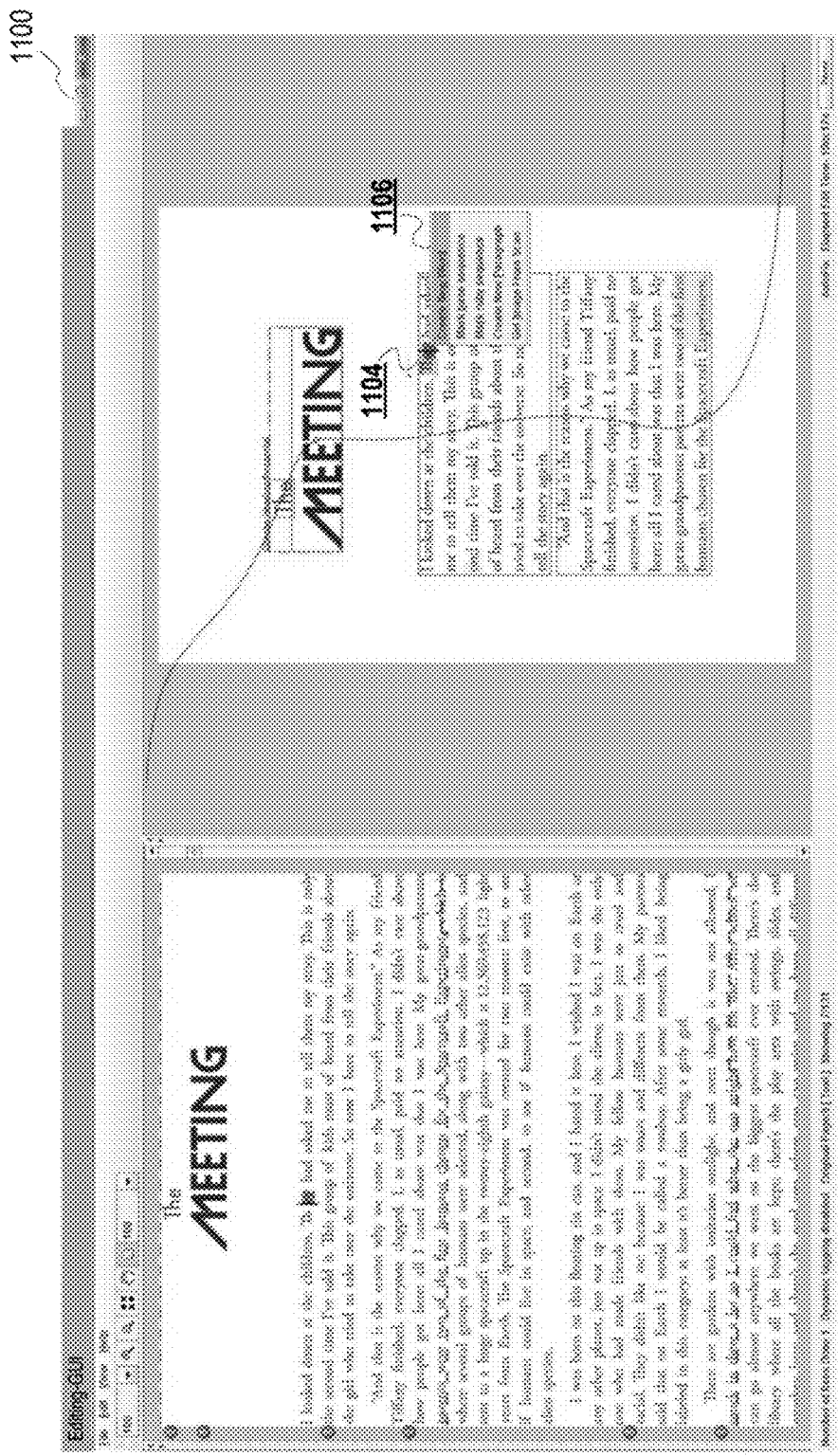

Returning to FIG. 8, at block 809, processing logic corrects the positioning of the parts of the broken word to match the original position in the physical work. In one implementation, processing logic receives user input requesting to correct the broken word. FIG. 10 is an example GUI 1000 that includes a pane for a reflow mode representation 1002 and a pane for an original scan mode representation 1004. A user can select a broken word "They" 1006 in the original scan mode representation 1004, for example, by dragging a mouse over the broken word "They" 1006. The broken word "They" 1006 in the original scan mode representation 1004 can correspond to the parts "Th" 1008 and "ey" 1010 of the broken word in the reflow mode representation 1002. FIG. 11 is an example of pop-up menu 1106 in a window in the GUI 1100 to receive user input to correct the broken word "They" 1104. A user may, for example, right-click the broken word "They" 1104 using a mouse and select "Create New Word" in the pop-up menu 1106 to correct the broken word "They" 1104.

Figure 12:
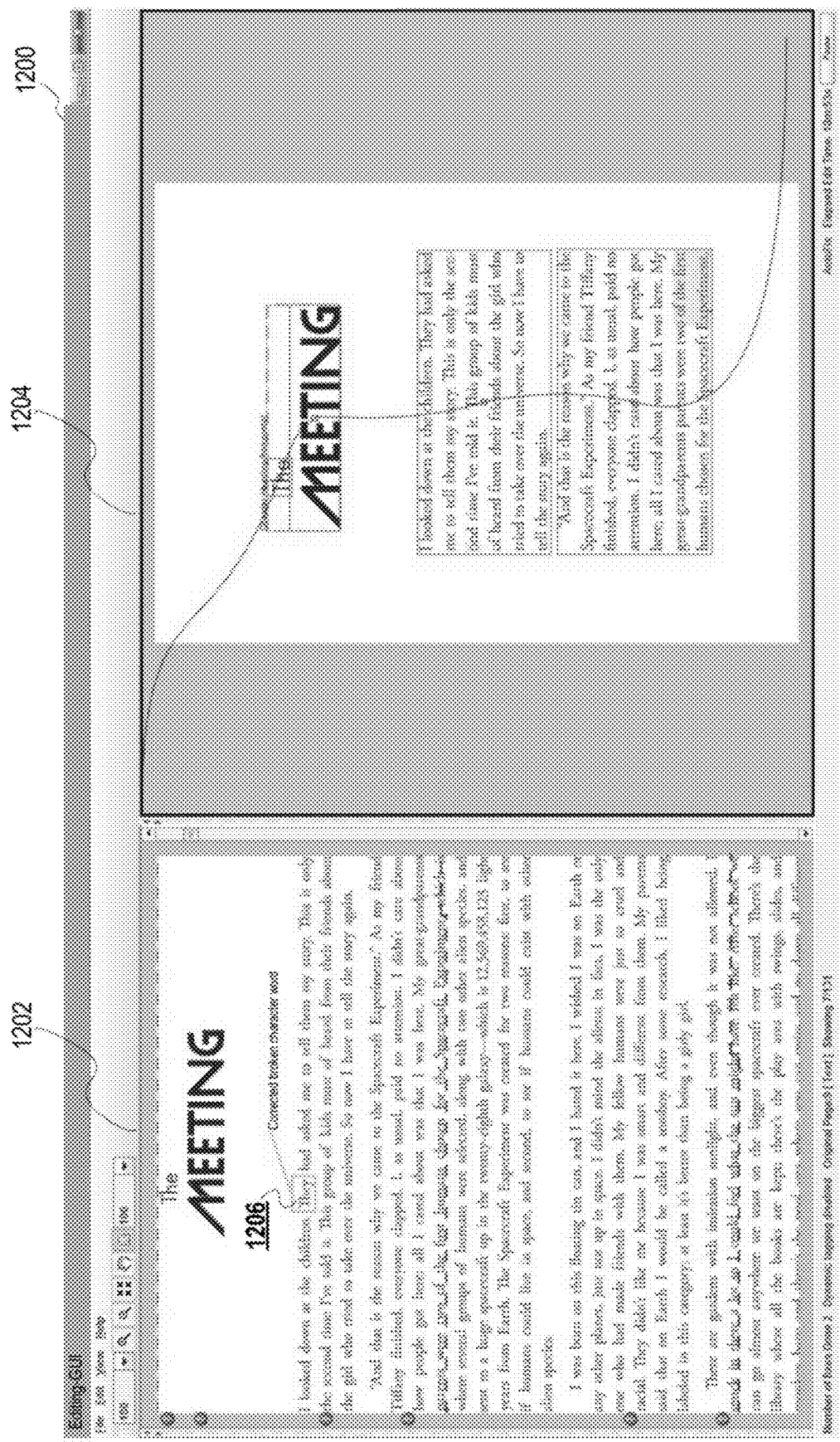

Returning to FIG. 8, in another implementation, at block 809, processing logic automatically corrects the positioning of the parts of the broken word to match the original positioning in the physical work. Processing logic can correct the broken word to match the original positioning data of "Th" and "ey" to bring the position of these elements (e.g., letters) together in the reflow mode representation, such that "Th" and "ey" no longer flow separately. FIG. 12 is an example GUI 1200 that includes a pane for a reflow mode representation 1202 and a pane for an original scan mode representation 1204. Processing logic can add the bounds of each of the multiple parts to each other in the reflow mode representation 1202 to form the corrected word. For example, processing logic may add the bounds of "Th" to the bounds of "ey" in the reflow representation mode representation 1202, such that a user may perceive a single word, such as "They" 1206. Processing logic can add the bounds for each of the multiple parts to change the distance between the multiple parts and merge the elements to form a single correct word.

Figure 13:
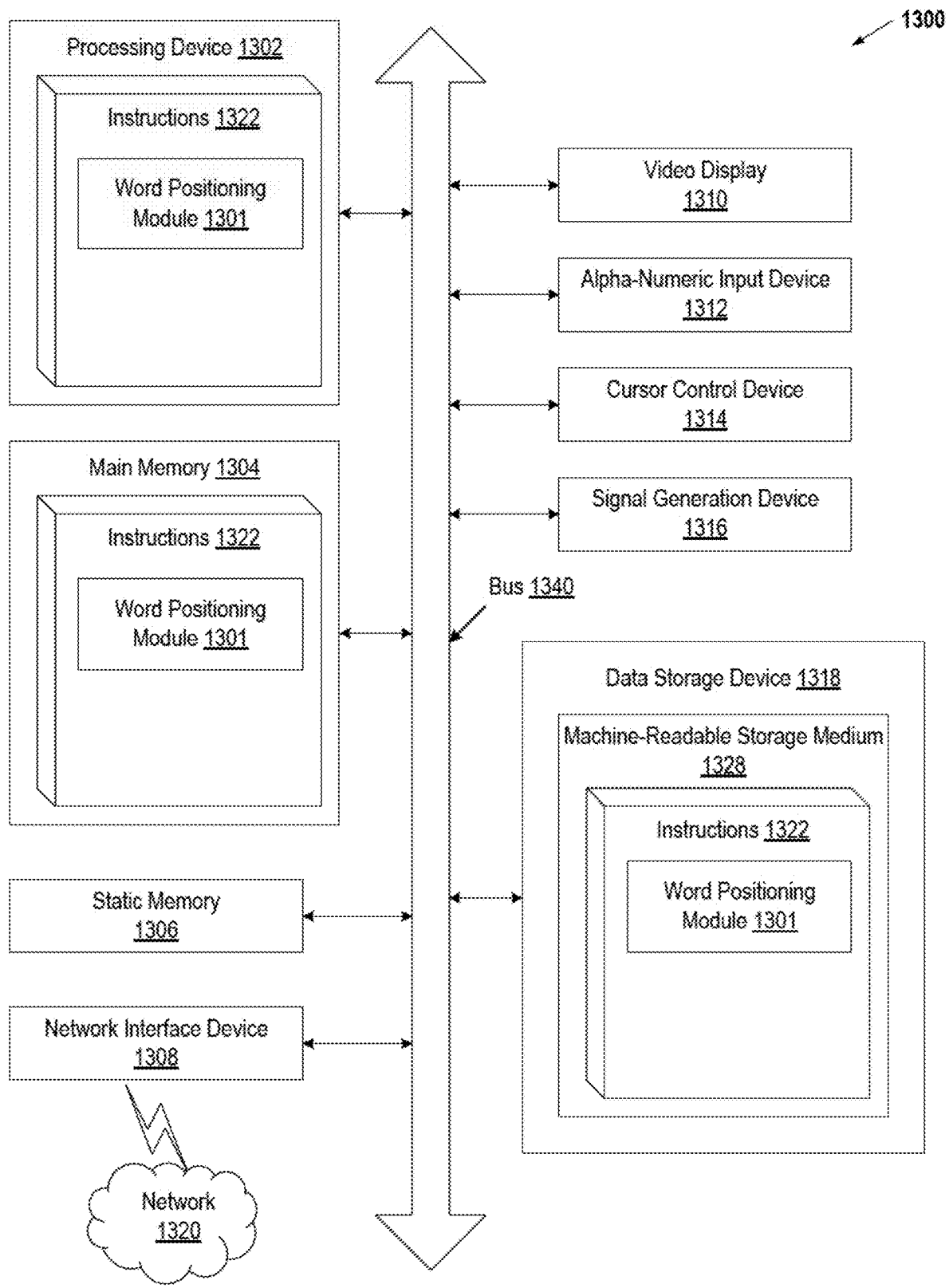
FIG. 13 illustrates components of an example device that can be used in accordance with one or more implementations.

FIG. 13 illustrates components of an example computing device 1300 that can be used in accordance with various implementations. In one implementation, the computing device 1300 corresponds to an editing device, a scanning device, an optical character recognition (OCR) device, a file generator device, a device in an electronic work distribution system, or a reading device. In some implementations, any combination of the functionality of the editing device, the scanning device, the OCR device, the file generator device, and the device in an electronic work distribution system can be combined into a single device. The computing device 1300 includes a set of instructions for causing the device to perform any one or more of the methodologies discussed herein. In alternative implementations, the device may be connected (e.g., networked) to other devices in a LAN, an intranet, an extranet, or the Internet. The device may operate in the capacity of a server machine in client-server network environment. The device may be a personal computer (PC), a set-top box (STB), a server, a network router, switch or bridge, or any device capable of executing a set of instructions (sequential or otherwise) that specify actions to be taken by that device. Further, while only a single device is illustrated, the term "device" shall also be taken to include any collection of devices that individually or jointly execute a set (or multiple sets) of instructions to perform any one or more of the methodologies discussed herein.

The example computer device 1300 includes a processing system (processing device) 1302, a main memory 1304 (e.g., read-only memory (ROM), flash memory, dynamic random access memory (DRAM) such as synchronous DRAM (SDRAM), etc.), a static memory 1306 (e.g., flash memory, static random access memory (SRAM), etc.), and a data storage device 1318, which communicate with each other via a bus 1340.

Processing device 1302 represents one or more general-purpose processing devices such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1302 may also be one or more special-purpose processing devices such as an application specific integrated circuit (ASIC), a field programmable gate array (FPGA), a digital signal processor (DSP), network processor, or the like. In one implementation, the processing device 1302 is configured to execute a word spacing module 1301 for performing the operations and methods discussed herein.

The computer device 1300 may further include a network interface device 1308. The computer device 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker).

The data storage device 1318 may include a machine-readable storage medium 1328 (computer readable storage medium) on which is stored one or more sets of instructions (e.g., instructions of word spacing module 1301) embodying any one or more of the methodologies or functions described herein. The word spacing module 1301 may also reside, completely or at least partially, within the main memory 1304 and/or within the processing device 1302 during execution thereof by the computer device 1300, the main memory 1304 and the processing device 1302 also constituting computer-readable media. The word spacing module 1301 may further be transmitted or received over a network 1320 via the network interface device 1308.

While the computer-readable storage medium 1328 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the device and that cause the device to perform any one or more of the methodologies of the present disclosure. The term "computer-readable storage medium" shall accordingly be taken to include, but not be limited to, solid-state memories, optical media, and magnetic media.

Figure 14:
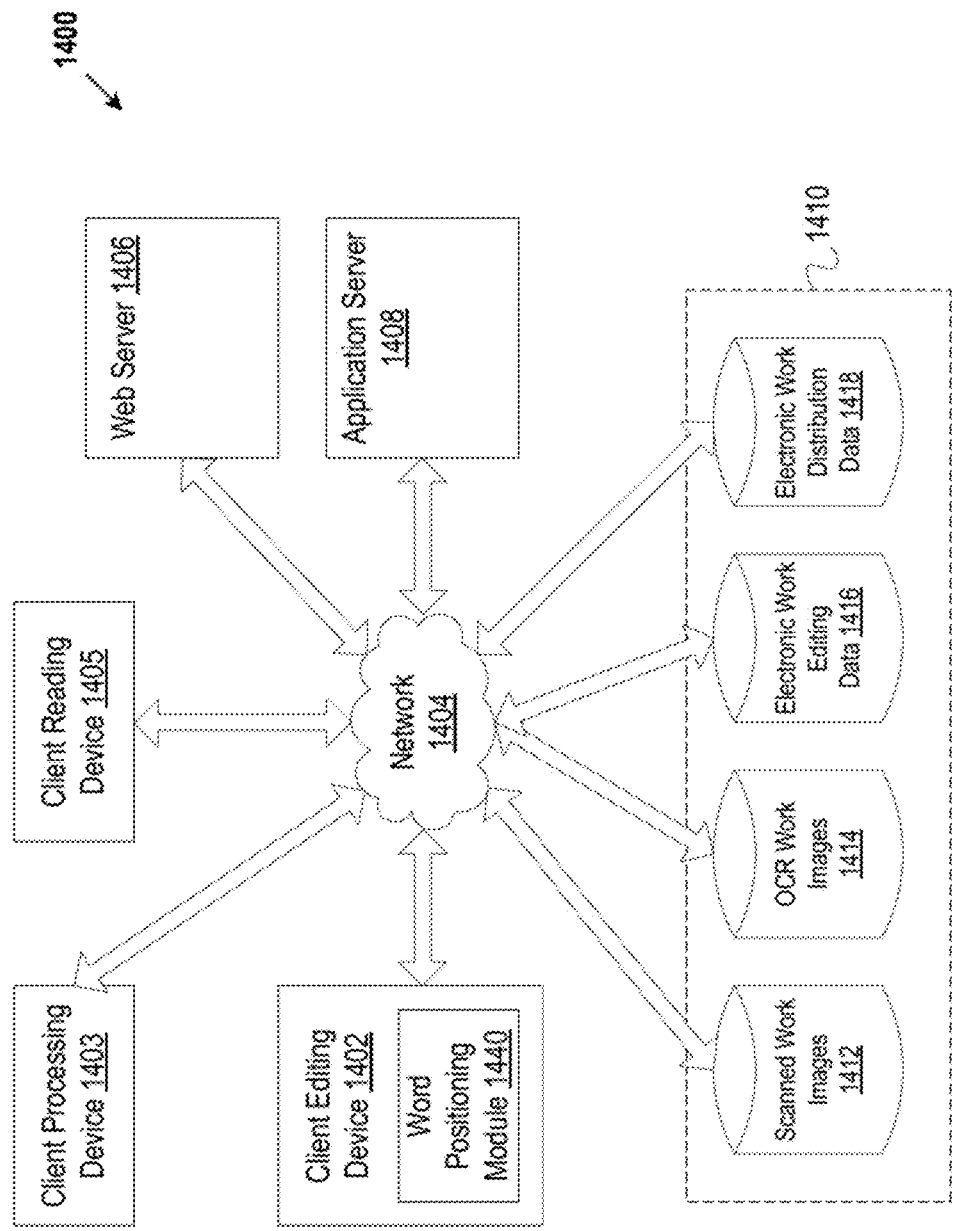
FIG. 14 illustrates an environment in which one or more implementations can be implemented.

As discussed, various approaches can be implemented in various environments for various applications. For example, FIG. 14 illustrates an example of an environment 1400 for implementing aspects in accordance with various implementations. As will be appreciated, although a Web-based environment is used for purposes of explanation, different environments may be used, as appropriate, to implement various implementations. The environment 1400 includes an electronic client editing device 1402, which can include any appropriate device operable to send and receive requests, messages, or information over an appropriate network 1404 and convey information back to a user of the device. The client editing device 1402 can include a word spacing module 1440, which can correspond to word spacing module 1301 in FIG. 13), to provide the ability for users that edit electronic works (e.g., electronic books) to use a graphical user interface (GUI) to quickly and easily detect and correct broken words caused by inaccurate optical character recognition (OCR) boundary detection.

The environment 1400 includes one or more client processing devices 1403, which can include any appropriate device operable to send and receive requests, messages, or information over an appropriate network 1404 and convey information back to a user of the device. The client processing device 1403 may be a scanning device, an optical character recognition (OCR) device, a file generator device, and/or a device in an electronic work distribution system. In some implementations, any combination of the functionality of the editing device, the scanning device, the OCR device, the file generator device, and the device in an electronic work distribution system can be combined into a single client processing device 1403.

The environment 1400 includes a client reading device 1405, which can include any appropriate device operable to send and receive requests, messages, or information over an appropriate network 1404 and convey information back to a user of the device. The client reading device 1403 enables end users to view electronic works (e.g., electronic books (e-books), electronic magazines, electronic newspapers, electronic journals, electronic comic books, etc.).

Examples of such client editing devices 1402, client processing device 1403, and client reading devices 1405 include personal computers, cell phones, handheld messaging devices, laptop computers, set-top boxes, personal data assistants, electronic book readers, and the like. The network 1404 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers 1408, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server 1408 can include any appropriate hardware and software for integrating with the data store as needed to obtain or provide content to client devices. The application server 1408 provides access control services in cooperation with the data store and is able to generate content such as text, graphics, audio, and/or video to be transferred or made available to the user, which may be served to the user by the Web server in the form of HTML, XML, or another appropriate structured language in this example. The handling of all requests and responses, as well as the delivery of content between the client devices 1402, 1403, 1405 and the application server 1408, can be handled by the Web server 1406, according to some implementations. It should be understood that the Web and application servers are not required and are merely example components, as structured code discussed herein can be executed on any appropriate device or host machine as discussed elsewhere herein.

The data store 1410 can include several separate data tables, databases, or other data storage mechanisms and media for storing data relating to a particular aspect. For example, the data store illustrated includes mechanisms for storing scanned work images 1412, optical character recognition (OCR) work images 1414, electronic work editing data 1416, and electronic work distribution data 1418, which can be used to serve content for the production side. It should be under stood that there can be many other aspects that may need to be stored in the data store, such as control commands, progress information, etc.

Each server 1406, 1408 typically will include an operating system that provides executable program instructions for the general administration and operation of that server 1406, 1408, and typically will include a computer-readable medium storing instructions that, when executed by a processor of the server 1406, 1408, allow the server 1406, 1408 to perform its intended functions. Suitable implementations for the operating system and general functionality of the servers 1406, 1408 are known or commercially available and are readily implemented by persons having ordinary skill in the art, particularly in light of the disclosure herein.

Each client device 1402, 1403, 1405 typically will include an operating system that provides executable program instructions for the general administration and operation of that client device 1402, 1403, 1405, and typically will include a computer-readable medium storing instructions that, when executed by a processor of the client device 1402, 1403, 1405, allow the client device 1402, 1403, 1405 to perform its intended functions. Suitable implementations for the operating system and general functionality of the client device 1402, 1403, 1405 are known or commercially available and are readily implemented by persons having ordinary skill in the art, particularly in light of the disclosure herein.

The environment in one implementation is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various implementations further can be implemented in a wide variety of operating environments, which in some cases can include one or more user computers, computing devices, or processing devices. User or client devices can include any of a number of general purpose personal computers, such as desktop or laptop computers running a standard operating system, as well as cellular, wireless, and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems, and other devices capable of communicating via a network.

Most implementations utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In implementations utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more Web applications that may be implemented as one or more scripts or programs written in any programming language. The server(s) may also include database servers, including without limitation those commercially available.

The environment can include a variety of data stores and other memory and storage media as discussed above. These can reside in a variety of locations, such as on a storage medium local to (and/or resident in) one or more of the computers or remote from any or all of the computers across the network. In a particular set of implementations, the information or shared content may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices can also include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate implementations may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various implementations.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A method comprising:
   receiving optical character recognition (OCR) information of elements of a plurality of words of a physical work;
   generating, in view of the OCR information, a first representation of the elements of the plurality of words, wherein the first representation corresponds to a display of the elements of the plurality of words via an electronic output device;
   generating, in a graphical user interface (GUI), an organized structure comprising a plurality of sections using the first representation generated based on original positions of the elements of the plurality of words in the physical work;
   receiving a selection of a first section of the plurality of sections in the organized structure in the GUI, wherein the first section comprises a pre-defined number of a plurality of words;
   identifying, by a processing device, an additional section of the plurality of sections in the organized structure preceding the first section as comprising a broken word comprising a first position of an element in the first representation that does not match an original position of the element in the physical work; and
   changing, by the processing device, a positioning of the element in the first representation from the first position to a second position that matches the original position of the element in the physical work.

2. The method of claim 1, further comprising:
   receiving optical character recognition (OCR) bounds for the physical work; and
   determining the first position of the element of the broken word using the OCR bounds.

3. The method of claim 2, further comprising:
determining an additional position of an additional element of the broken word using the OCR bounds; and
generating a corrected position of a corrected word by adding together the OCR bounds of the broken word and the OCR bounds of the additional element of the broken word.

4. The method of claim 1, further comprising:
generating the organized structure, wherein the organized structure comprises at least one of a grid, a table, or a group of lists.

5. The method of claim 4, further comprising:
outputting a first instance of the pre-defined number of words in the first section of the plurality of sections in the organized structure for display in the GUI; and
outputting a second instance of the pre-defined number of words in a second section of the plurality of sections in the organized structure for display in the GUI.

6. The method of claim 1, further comprising:
generating an optical character recognition (OCR) representation of the elements of the plurality of words in positions that match the original positions in the physical work; and
generating the first representation of the elements of the plurality of words in positions to be displayed in the electronic reading device.

7. The method of claim 6, further comprising:
receiving a selection of a first selected word from the OCR representation; and
identifying the first selected word as a first broken word in the first representation.

8. The method of claim 7, further comprising:
correcting a first position of an element of the first broken word in the first representation to match the position of the element of the first selected word from the OCR representation.

9. The method of claim 1, further comprising:
receiving original positioning data describing the original position for the element in the physical work, wherein the original positioning data comprises rectangular coordinates for the element in the physical work; and
re-positioning the element in a representation for display in the GUI using the rectangular coordinates for the element in the physical work.

10. The method of claim 1, further comprising:
generating a file for the physical work using the second position of the element; and
sending the file to a first electronic output device.

11. An apparatus comprising:
a memory; and
a processing device, operatively coupled to the memory, wherein the processing device is to:
receive optical character recognition (OCR) information of elements of a plurality of words of a physical work;
generate, in view of the OCR information, a first representation of the elements of the plurality of words, wherein the first representation corresponds to a display of the elements of the plurality of words via an electronic output device;
generate, in a graphical user interface (GUI), an organized structure comprising a plurality of sections using the first representation generated based on original positions of the elements of the plurality of words in the physical work;
receive a selection of a first section of the plurality of sections in the organized structure in the GUI, wherein the first section comprises the pre-defined number of words;
identify, by a processing device, an additional section of the plurality of sections in the organized structure preceding the first section as comprising a broken word comprising a first position of an element in the first representation that does not match an original position of the element in the physical work; and
change, by the processing device, a positioning of the element in the first representation from the first position to a second position that matches the original position in the physical work.

12. The apparatus of claim 11, wherein the processing device is further to:
receive optical character recognition (OCR) bounds for the physical work; and
determine the first position of the element of the broken word using the OCR bounds.

13. The apparatus of claim 12, wherein the processing device is further to:
determine an additional position of an additional element of the broken word using the OCR bounds; and
generate a corrected position of a corrected word by adding together the OCR bounds of the broken word and the OCR bounds of the additional element of the broken word.

14. The apparatus of claim 11, wherein the processing device is further to:
generate the organized structure, wherein the organized structure comprises at least one of a grid, a table, or a group of lists.

15. The apparatus of claim 14, wherein the processing device is further to:
output a first instance of the pre-defined number of words in the first section of the plurality of sections in the organized structure for display in the GUI; and
output a second instance of the pre-defined number of words in a second section of the plurality of sections in the organized structure for display in the GUI.

16. The apparatus of claim 11, wherein the processing device is further to:
generate an optical character recognition (OCR) representation of the elements of the plurality of words in positions that match the original positions in the physical work; and
generate the first representation of the elements of the plurality of words in positions to be displayed in the electronic reading device.

17. The apparatus of claim 16, wherein the processing device is further to:
receive a selection of a first selected word from the OCR representation; and
identify the first selected word as a first broken word in the first representation.

18. The apparatus of claim 17, wherein the processing device is further to:
correct a first position of an element of the first broken word in the first representation to match the position of the element of the first selected word from the OCR representation.

19. The apparatus of claim 11, wherein the processing device is further to:
receive original positioning data describing the original position for the element in the physical work, wherein the original positioning data comprises rectangular coordinates for the element in the physical work; and re-position the element in a representation for display in the GUI using the rectangular coordinates for the element in the physical work.

20. The apparatus of claim 11, wherein the processing device is further to:

generate a file for the physical work using the second position of the element; and send the file to a first electronic output device.

\* \* \* \* \*